(12) United States Patent
Sekizuka

(10) Patent No.: US 11,999,313 B2
(45) Date of Patent: Jun. 4, 2024

(54) VEHICLE SIDE STRUCTURE

(71) Applicant: TOYOTA JIDOSHA KABUSHIKI KAISHA, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/131,944

(22) Filed: Apr. 7, 2023

(65) Prior Publication Data

US 2023/0322178 A1 Oct. 12, 2023

(30) Foreign Application Priority Data

Apr. 12, 2022 (JP) ................................ 2022-065767

(51) Int. Cl.
*B60R 21/232* (2011.01)
*B60R 21/16* (2006.01)
*B60R 21/231* (2011.01)

(52) U.S. Cl.
CPC ...... *B60R 21/232* (2013.01); *B60R 21/23138* (2013.01); *B60R 2021/161* (2013.01)

(58) Field of Classification Search
CPC ............ B60R 21/232; B60R 21/23138; B60R 2021/161
See application file for complete search history.

(56) References Cited

U.S. PATENT DOCUMENTS

| 7,044,500 B2* | 5/2006 | Kalandek ............ B60R 21/2338 |
| | | 280/730.2 |
| 2019/0184929 A1* | 6/2019 | Ward .................... B60R 21/233 |

FOREIGN PATENT DOCUMENTS

| CN | 204236412 U | * | 4/2015 | ................ B60N 2/44 |
| JP | 2010076708 A | * | 4/2010 | ............ B60J 1/2011 |
| JP | 2020-059329 A | | 4/2020 | |
| WO | WO-2014129054 A1 | * | 8/2014 | ........... B60R 21/201 |

\* cited by examiner

*Primary Examiner* — Faye M Fleming
(74) *Attorney, Agent, or Firm* — Dinsmore & Shohl LLP

(57) ABSTRACT

A vehicle side structure includes a window, which has a window opening defined in a side wall of a vehicle and a window glass for covering the window opening, a curtain air bag device attached to a position above the window, and a bar-shaped member configured to partition the window opening into upper and lower sections when viewed along a lateral direction of the vehicle. In the vehicle side structure, the bar-shaped member is placed inside the window opening or at a position located, in a vehicle width direction, on an inner side of the window opening and also on an outer side of a fully inflated curtain air bag, and at least a part of the fully inflated curtain air bag expands to a region below the bar-shaped member.

20 Claims, 8 Drawing Sheets

VEHICLE SIDE STRUCTURE

CROSS REFERENCE TO RELATED APPLICATION

This application claims priority to Japanese Patent Application No. 2022-065767 filed on Apr. 12, 2022, which is incorporated herein by reference in its entirety including the specification, claims, drawings, and abstract.

TECHNICAL FIELD

The present disclosure discloses a vehicle side structure including a window formed on a side wall of a vehicle and a curtain air bag device disposed above the window.

BACKGROUND

There have been conventionally known curtain air bag devices that are inflated to deploy between a vehicle occupant and a window on a side portion of a vehicle at the occurrence of a side collision of the vehicle, in order to protect the vehicle occupant. For example, Patent Document 1 discloses a curtain air bag device for a vehicle, the air bag device including a curtain air bag which is inflated to deploy along a side window glass toward a lower region of the vehicle.

CITATION LIST

Patent Literature

Patent Document 1: JP 2020-059329 A

Here, at the occurrence of a collision of a vehicle, a window glass covering a window opening may be broken, and in some cases the window opening may become open to the outside. In this situation, there has been a danger that an inflated and deployed curtain air bag could fly out of the vehicle through the window opening. To prevent the danger, the size of a curtain air bag is typically defined such that a part of the curtain air bag overlaps a door trim panel when the curtain air bag is inflated and deployed. In this way, even when the curtain air bag attempts to fly out of the vehicle, the part of the curtain air bag is hitched to the door trim panel, and the curtain air bag is accordingly prevented from flying out of the vehicle.

However, it is necessary that either the curtain air bag be increased in size, or an upper end of a trim panel; i.e., a lower border of the window opening, be raised, in order to overlap a part of the curtain air bag with the door trim panel in the vehicle width direction. In the former, increasing the size of the curtain air bag will incur a problem in that a cost for manufacturing the curtain air bag device is also increased. On the other hand, in the latter, raising the lower border of the window opening will incur a problem in that the window opening will be narrowed by the raised lower end, resulting in a limited field of view of a vehicle occupant to observe the outside.

Patent Document 1 further discloses a technique of attaching a tension member to a surface of the curtain air bag, the tension member configured to extend, when the curtain air bag is inflated and deployed, from a position close to an upper forward corner of the curtain air bag to a position close to a lower end of the curtain air bag along a direction descending toward the rear. The curtain air bag can be maintained in a tensioned state by providing the tension member, which can, in turn, prevent the curtain air bag from flying out of the vehicle. In Patent Document 1, however, because of the presence of the tension member attached to the curtain air bag, there is another problem in that the size of the curtain air bag in a folded state is increased. Further, the cost for manufacturing the curtain air bag device is also increased by installing the tension member.

Under the circumstances, the present disclosure discloses a vehicle side structure which can prevent a curtain air bag from flying out of a vehicle, while preventing both an increase in cost and a decrease in visibility.

SUMMARY

A vehicle side structure according to an aspect of the present disclosure includes a window, which has a window opening defined in a side wall of a vehicle and a window glass configured to cover the window opening, a curtain air bag device which is attached to a position above the window and equipped with a curtain air bag being inflatable to expand downward, and a bar-shaped member which is configured to partition the window opening into upper and lower sections when viewed along a lateral direction of the vehicle, in which the bar-shaped member is disposed inside the window opening or at a position located, in a vehicle width direction, on an inner side of the window opening and also on an outer side of the curtain air bag being fully inflated. In the vehicle side structure, at least a part of the curtain air bag being fully inflated expands to a region below the bar-shaped member.

When configured as described above, even though the fully inflated curtain air bag attempts to fly out of the vehicle through the window opening, the curtain air bag will get caught by the bar-shaped member and hitched thereto, thereby preventing an escape of the curtain air bag flying out of the vehicle. Further, the curtain air bag can be hitched to the bar-shaped member even when the curtain air bag is smaller than the window opening, or a lower border of the window opening is located below the curtain air bag. Therefore, the above-described configuration can prevent the curtain air bag from flying out of the vehicle, while also preventing both an increase in a cost for manufacturing the curtain air bag device and a decrease in visibility.

In this case, the bar-shaped member may be positioned so as to be adjacent to the window glass via a gap smaller than a thickness of the curtain air bag being fully inflated.

The bar-shaped member and the window glass are provided as separate parts, which can simplify the structure of the window. Further, the gap between the bar-shaped member and the window glass is defined to be smaller than the thickness of the fully inflated curtain air bag, which can ensure that the curtain air bag does not enter the gap between the bar-shaped member and the window glass.

Further, the bar-shaped member may be a division bar placed inside the window opening so as to divide the window glass.

When configured as described above, the curtain air bag can be reliably prevented from entering the gap between the bar-shaped member and the window glass.

Still further, the vehicle side structure may include a seat disposed at a position adjacent to the side wall of the vehicle, the seat on which a vehicle occupant sits, and the bar-shaped member may be positioned at a height lower than a head of the vehicle occupant sitting on the seat.

The above-described configuration can ensure that the curtain air bag reliably protects the head of the vehicle occupant.

Moreover, a vertical position of a lower border of the window opening may substantially match a vertical position of the lower end of the fully inflated curtain air bag or may lie below the vertical position of the lower end of the fully inflated curtain air bag.

In the above-described configuration, a large window opening can be secured without increasing the cost for manufacturing the curtain air bag device.

Further, the vehicle side structure may include a side mirror disposed outside the window in the vehicle width direction, and the bar-shaped member may extend below a straight line connecting a lowermost end of a 95th percentile eyellipse and a lower end of the side mirror.

When configured as described above, the bar-shaped member does not obstruct driving visibility.

According to the vehicle side structure disclosed herein, the escape of the curtain air bag flying out of the vehicle can be prevented while preventing both an increase in costs and deterioration in visibility.

BRIEF DESCRIPTION OF DRAWINGS

Embodiments of the present disclosure will be described based on the following figures, wherein.

DESCRIPTION OF EMBODIMENTS

Figure 1:
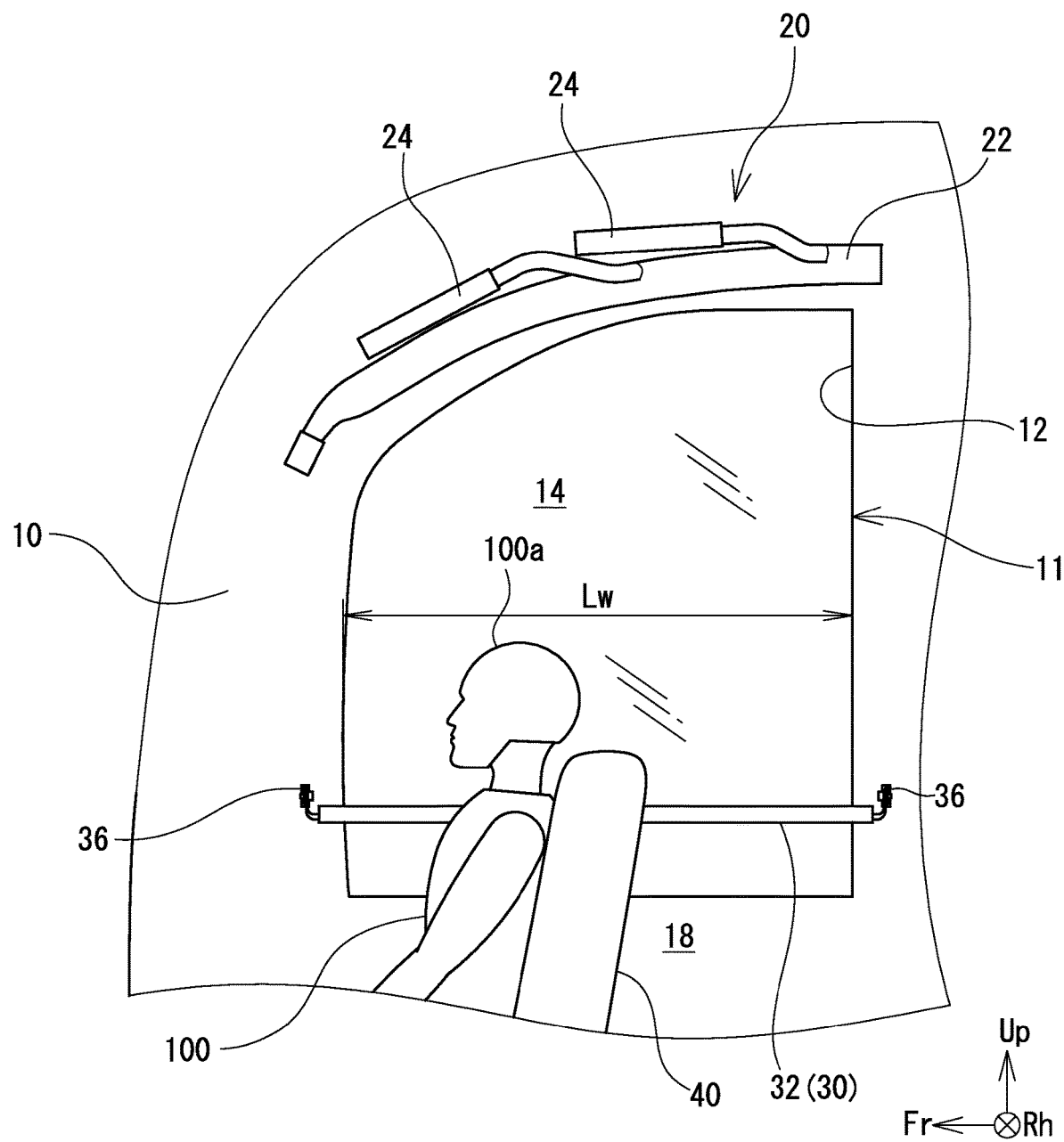
FIG. 1 shows a right side portion of a vehicle that is viewed from inside the vehicle.
Figure 2:
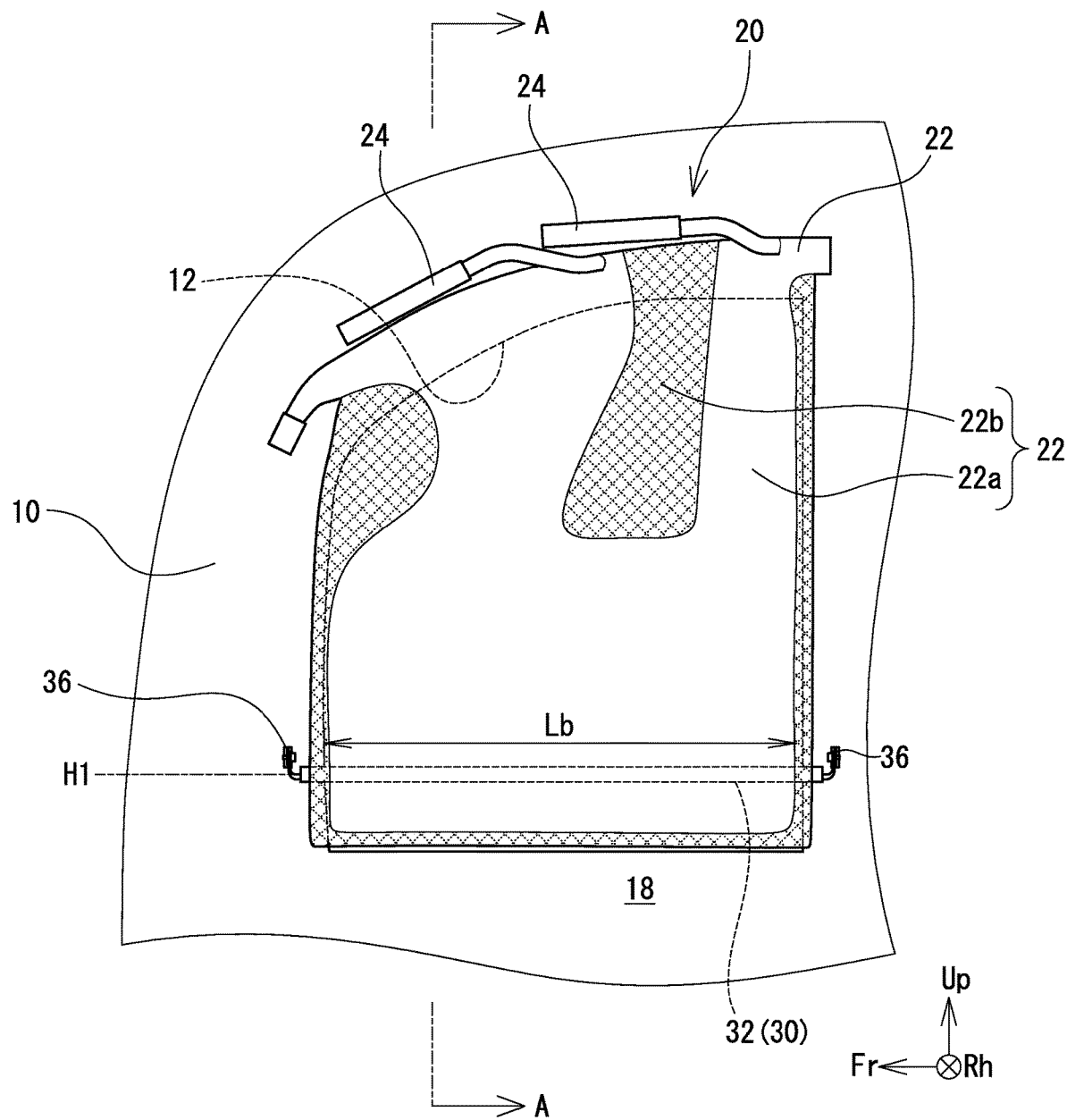
FIG. 2 shows the side portion of the vehicle in which a curtain air bag is expanded.
Figure 3:
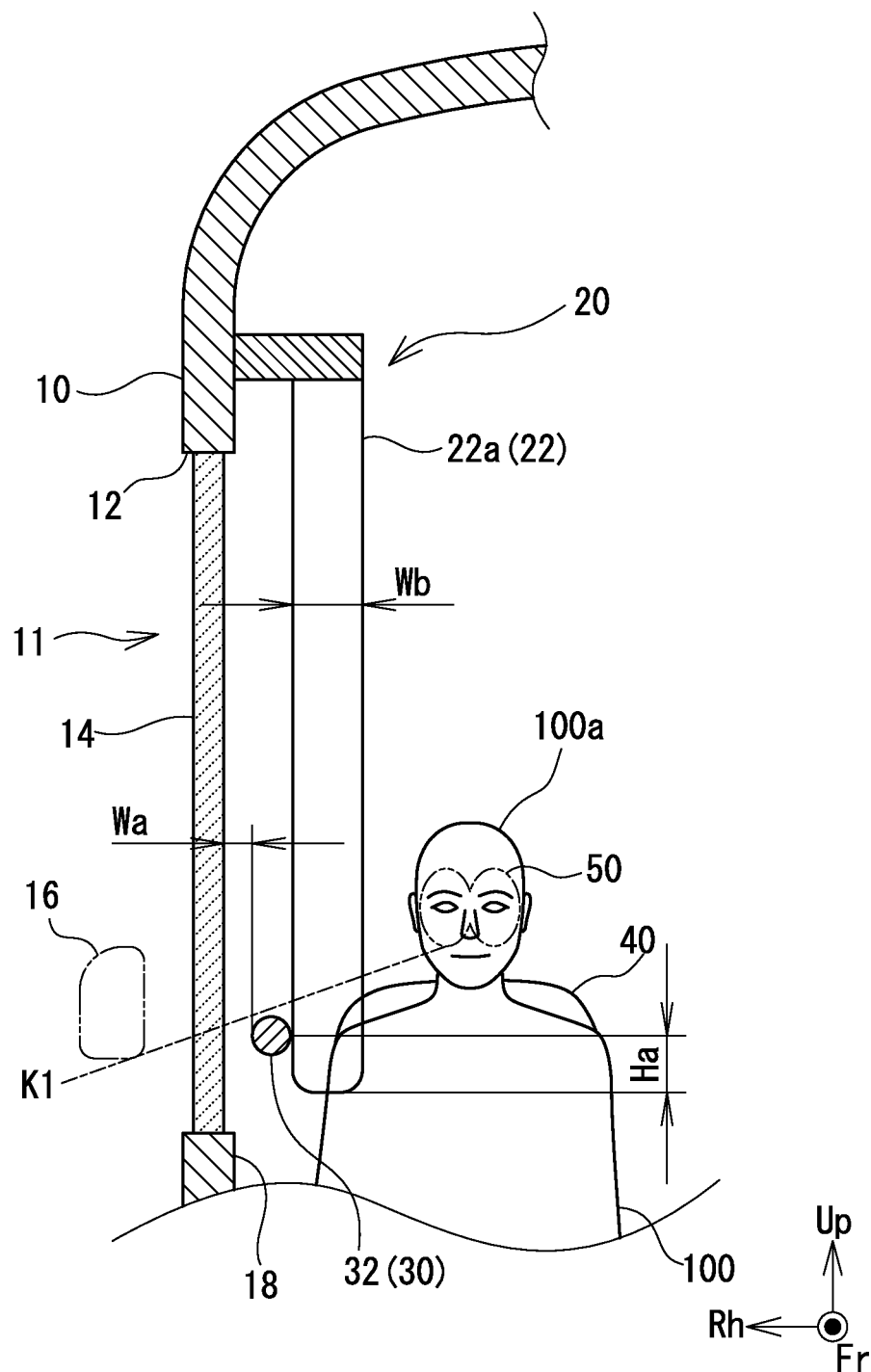
FIG. 3 shows a cross sectional view taken along a line A-A indicated in FIG. 2.

Hereinafter, a vehicle side structure will be described with reference to the drawings. FIG. 1 shows a side portion (right side portion in the illustrated example) of a vehicle as viewed from inside the vehicle. FIG. 2 shows the side portion of the vehicle in which a curtain air bag 22 is expanded. FIG. 3 is a cross sectional view taken along a line A-A indicated in FIG. 2. In the drawings, reference letters "Fr," "Up," and "Rh" denote a forward direction, an upward direction, and a rightward direction of the vehicle, respectively.

As shown in FIGS. 1 to 3, a window 11 is disposed on a side wall 10 of the vehicle. The window 11 is composed of a window opening 12, and a window glass 14 fitted in the window opening 12. A trim panel 18 is arranged below the window opening 12, the trim panel 18 being a designed panel formed of resin. In this example, the window 11 is a fixed sash window in which the window glass 14 is fixed so as not to move relative to the window opening 12. However, the window 11 may be, of course, an openable window in which the window glass 14 is able to move up and down relative to the window opening 12.

A seat 40 (which is not illustrated in FIG. 2) on which a vehicle occupant 100 sits is disposed beside the window 11. In this example, the window 11 is located in a front portion of the vehicle, and the seat 40 disposed beside the window 11 is a driver seat or a front passenger seat. As shown in FIGS. 1 and 3, a lower border of the window opening 12 is located at a position lower than a head 100a of the vehicle occupant 100, while an upper border of the window opening 12 is located at a position sufficiently higher than the head 100a of the vehicle occupant 100.

Figure 7:
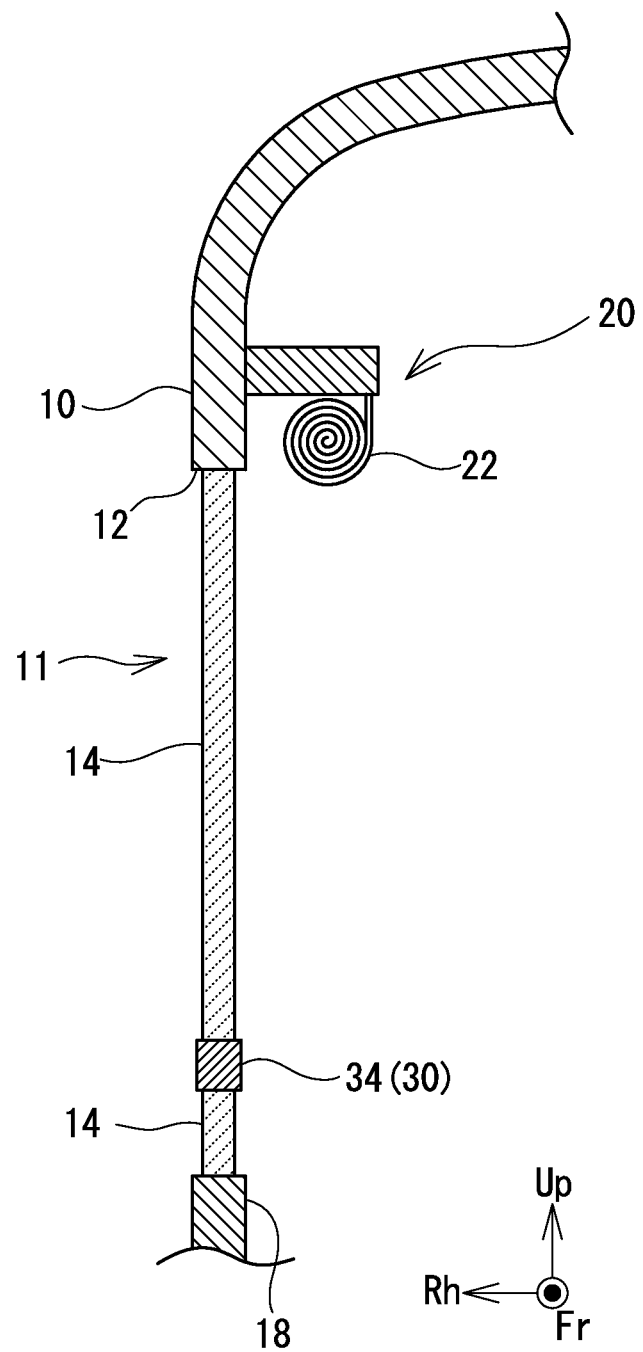
FIG. 7 shows another example of the vehicle side structure.

A curtain air bag device 20 is arranged above the window 11. The curtain air bag device 20 is configured to inflate and expand the curtain air bag 22 between the side wall 10 and the vehicle occupant 100 when receiving a strong impact from a side surface of the vehicle, to thereby lessen the impact exerted on the head 100a of the vehicle occupant 100. The curtain air bag device 20 includes the curtain air bag 22 and an inflator 24. The curtain air bag is a member shaped like a bag. At normal times, the curtain air bag 22 is rolled up, as shown in FIG. 7, in an outwardly wound roll that is assembled as a long member extending along a longitudinal direction of the vehicle. To maintain the roll of the curtain air bag 22, an adhesive or a restraint member is used to fix or restrain the curtain air bag 22 in the shape of the roll. An adhering force of the adhesive and a restraining force of the restraint member are defined to be sufficiently smaller than an expansion pressure applied to the curtain air bag 22 when the inflator 24 is actuated, which will be described below. For this reason, when the inflator 24 is actuated, the curtain air bag 22 is expanded while opposing the adhering force of the adhesive or the restraining force of the restraint member.

When the curtain air bag 22 is fully inflated, the curtain air bag 22 covers most of the window 11, as illustrated in FIGS. 2 and 3. Further, the fully inflated curtain air bag 22 has an inflating region 22a which is inflated by gas flowing therein and noninflating regions 22b in which no gas is introduced. In FIG. 2, the noninflating regions 22b are hatched. When the curtain air bag 22 partially includes the noninflating regions 22b, an amount of gas required to fully inflate the curtain air bag 22 can be reduced, which can cause the curtain air bag 22 to expand rapidly. A location of the inflating region 22a is determined in consideration of a position of the vehicle occupant 100.

A dimension Lb (see FIG. 2) of the inflating region 22a in the longitudinal direction of the vehicle is substantially equal to a dimension Lw (see FIG. 1) of the window in the longitudinal direction of the vehicle. Further, a lower end of the inflating region 22a of the curtain air bag 22 is located above a lower border of the window 11 and below a bar-shaped member 30 which is described below. When the lower end of the inflating region 22a is defined to be higher than the lower border of the window 11, the curtain air bag 22 can be reduced in size, which can, in turn, reduce a cost for manufacturing the curtain air bag device 20.

The inflator 24 generates, upon detection of a collision, a gas to inflate the curtain air bag 22. In this example, two inflators 24 are installed at locations spaced from each other along the longitudinal direction of the vehicle, to supply the gas from the two locations into the curtain air bag 22.

As shown in FIGS. 1 to 3, a transverse pipe 32 functioning as the bar-shaped member 30 is disposed at a position located inward, in the vehicle width direction, of the window 11. The transverse pipe 32 extends along the longitudinal direction of the vehicle in such a manner that the window opening 12 is partitioned into upper and lower sections by the transverse pipe 32 when viewed along a lateral direction of the vehicle. The transverse pipe 32 is composed of a material having high strength, such as a metal, for example. In addition, both ends of the transverse pipe 32 are fixed through fixation brackets 36 (shown in FIGS. 1 and 2) onto the side wall 10 of the vehicle.

As shown in FIG. 3, the transverse pipe 32 is located, when the curtain air bag 22 is fully inflated, between the curtain air bag 22 and the window glass 14. In other words, the transverse pipe 32 is located on an outer side of the fully inflated curtain air bag 22 in the vehicle width direction and on an inner side of the window glass 14 in the vehicle width direction. A gap Wa between the transverse pipe 32 and the window glass 14 is smaller than a thickness Wb of the curtain air bag 22. For this reason, the curtain air bag 22 is hampered from entering a space between the transverse pipe 32 and the window glass 14 and is thus inflated to expand in an area located inward of the transverse pipe 32 in the vehicle width direction.

The transverse pipe 32 is located above the lower border of the window opening 12 and below the head 100a of the vehicle occupant 100. Here, a position of the head 100a of the vehicle occupant 100 varies greatly depending on the physique of the vehicle occupant 100 and other factors. With this in view, the position of the head 100a of the vehicle occupant 100 may be estimated based on an eyellipse, for example. The eyellipse is an oblong circle embracing eye positions of various drivers. The eyellipse is calculated through statistical analysis of the eye positions of drivers. The range of the eyellipse is defined as "JIS D0021: eye range of drivers for automobiles" under the Japanese Industrial Standards, for example. An oblong circle containing P % of eyes in a distribution of driver's eyes is referred to as a "Pth percentile eyellipse". Taking a length from the center of the pupils to a chin of a driver as a, it can be estimated that a lower end of the head 100a of the driver 100 is situated at a position lowered by the length a from the lowermost end of the 95th percentile eyellipse. It should be noted that the length a from the center of the pupils to the chin may be obtained statistically. The transverse pipe 32 is disposed so as to be lower than the lower end of the head 100a calculated as described above.

In addition, the transverse pipe 32 is arranged so as not to obstruct driving visibility of the vehicle occupant 100, in particular, a driver. For example, the transverse pipe 32 is positioned, as shown in FIG. 3, in such a manner that the transverse pipe 32 extends below a straight line K1 connecting the lower end of a 95th percentile eyellipse 50 and a lower end of a side mirror 16. When the transverse pipe 32 is positioned in this way, the driving visibility of the driver can be appropriately secured even though the transverse pipe 32 is present.

Figure 5:
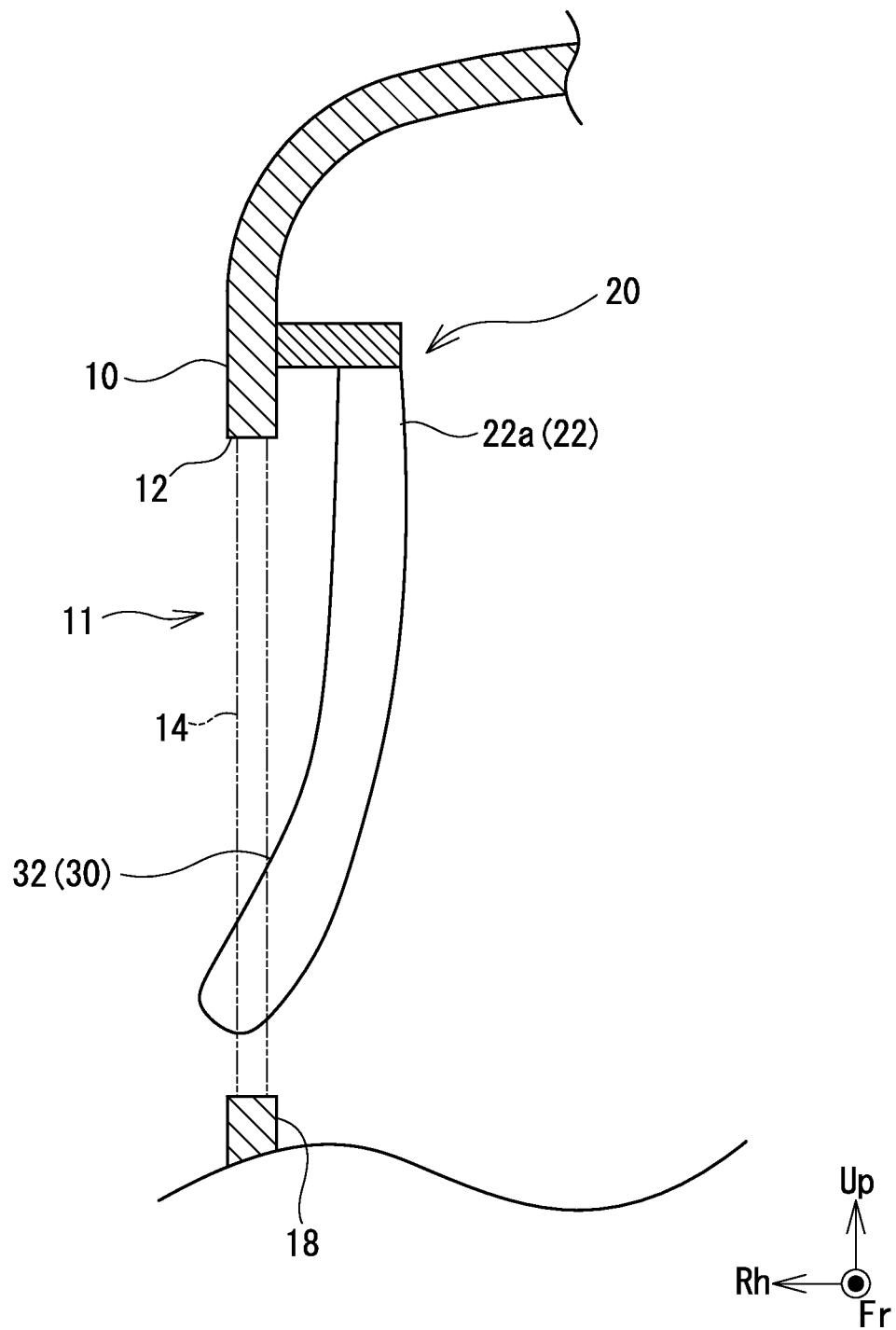
FIG. 5 shows behavior of a curtain air bag at the occurrence of a side collision in a comparative example.

Hereinafter, a reason for installing the transverse pipe 32 is explained while comparing the vehicle side structure of the present example with a comparative example. FIG. 5 shows a cross sectional view of a vehicle side structure according to the comparative example. As illustrated in FIG. 5, the bar-shaped member 30 is not installed in the comparative example.

Here, behavior of the curtain air bag device 20 and the vehicle occupant 100 at the occurrence of a side collision caused by an obstacle colliding against a side surface of a vehicle is explained. Upon detection of the side collision, the curtain air bag device 20 actuates the inflator 24 to inflate and expand the curtain air bag 22. Meanwhile, the head 100a of the vehicle occupant 100 is moved outward in the vehicle width direction due to the inertial force. At this time, because the curtain air bag 22 intervenes in a space between the head 100a of the vehicle occupant 100 and the window glass 14, the head 100a bumps against the curtain air bag 22 in an early stage of the collision, and is thus prohibited from moving further. In this way, the head 100a of the vehicle occupant 100 can be appropriately protected.

However, there is a case where the window glass 14 may be broken depending on a state of the side collision, and broken pieces of the window glass 14 may be scattered around. In other words, a member (i.e., the window glass 14) which functions to restrict movement of the curtain air bag 22 may be lost from a region located on the inner side of the window opening 12. There is another case where the window 11 is an openable window, and the window 11 may be open at the occurrence of the side collision. In such cases, the comparative example which lacks the bar-shaped member 30 is vulnerable to a risk that the curtain air bag 22 could fly out of the vehicle while being pushed outward in the vehicle width direction by the head 100a.

As a measure to prevent such an escape of the curtain air bag 22 flying out, it is conceivable that the lower end of the inflating region 22a may be elongated downwardly so as to be situated below the lower border of the window opening 12. When configured in this way, because a lower section of the inflating region 22a is caught by the trim panel 18 disposed below the window opening 12, the curtain air bag 22 can be prevented from flying out or being flung away. In this case, however, it is necessary to increase the size of the curtain air bag 22, which is accompanied with an increase in the cost for manufacturing the curtain air bag device 20. To circumvent such an increase in the cost, the lower border of the window opening 12 may be raised to a higher position rather than elongating the size of the curtain air bag 22. However, when the lower border of the window opening 12 is raised to the higher position and the trim panel 18 is accordingly broadened, visibility of the vehicle occupant 100, in particular, the driver is reduced correspondingly, which is also problematic.

Figure 4:
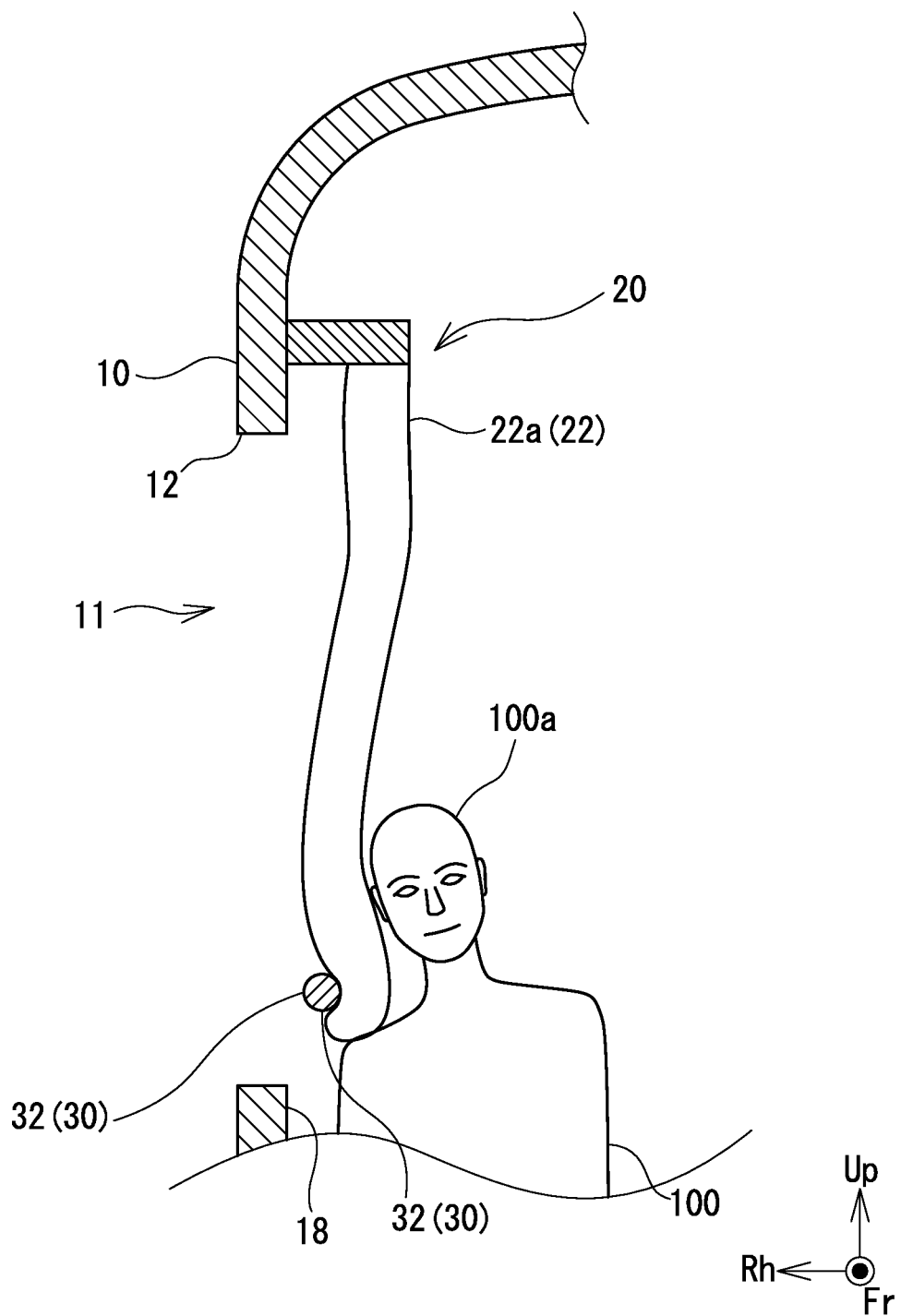
FIG. 4 shows behavior of the curtain air bag and a vehicle occupant at the occurrence of a side collision.

In the example according to this disclosure, the bar-shaped member 30 (in particular, the transverse pipe 32), which partitions the window opening 12 into upper and lower sections when viewed along the lateral direction, is installed to prevent the escape of the curtain air bag 22 flying out through the window opening 12. When the transverse pipe 32 is installed, because the lower section of the inflating region 22a is hitched to the transverse pipe 32, as shown in FIG. 4, the curtain air bag 22 can be effectively prevented from flying out even when the head 100a pushes the curtain air bag 22 outward in the vehicle width direction. As a result, the head 100a of the vehicle occupant 100 can be appropriately protected. Meanwhile, in this example, because the window opening 12 extends even below the transverse pipe 32, a broad visual field can be maintained. Further, in this example, the lower end of the inflating region 22a is located above the lower border of the window opening 12, which can prevent an increase in size of the curtain air bag 22 and thus cause no increase in the cost for manufacturing the curtain air bag device 20. That is, the escape of the curtain air bag 22 flying out of the vehicle can be effectively prevented with no increase in the cost or deterioration in visibility.

It should be noted that when an upper part of the curtain air bag 22 located above the transverse pipe 32 is pushed outward in the vehicle width direction, the curtain air bag 22 is bent to protrude outward in the vehicle width direction. Accompanying such bending movement, the lower end of the inflating region 22a is slid up. In this example, the size of the inflating region 22a is defined in such a manner that the lower end of the inflating region 22a is continuously located below the transverse pipe 32 even after the lower end of the inflating region 22a is slid up. For example, taking a vertical distance from a vertical center of the bar-shaped member 30 to the lower end of the inflating region 22a as Ha (see FIG. 3) and the thickness (i.e., a dimension in the vehicle width direction) of the inflating region 22a as Wb, the distance Ha may be defined to be greater than a value of 0.5×Wb, and for example, to be Ha>0.8×Wb, or Ha>Wb.

An overlapping range between the curtain air bag 22 and the transverse pipe 32 in the longitudinal direction of the vehicle should be increased to be as broad as possible, in order to prevent the curtain air bag 22 from flying out of the vehicle. In this example, as shown in FIG. 2, a length Lb of the inflating region 22a along the longitudinal direction of the vehicle measured at an installation height J1 of the transverse pipe 32 is set to a value substantially equal to a length Lw of the window opening 22 along the longitudinal direction of the vehicle. In this way, the transverse pipe 32 is able to catch hold of the curtain air bag 22 in a broad range, which can ensure that the escape of the curtain air bag 22 flying out of the vehicle is effectively prevented.

Figure 6:
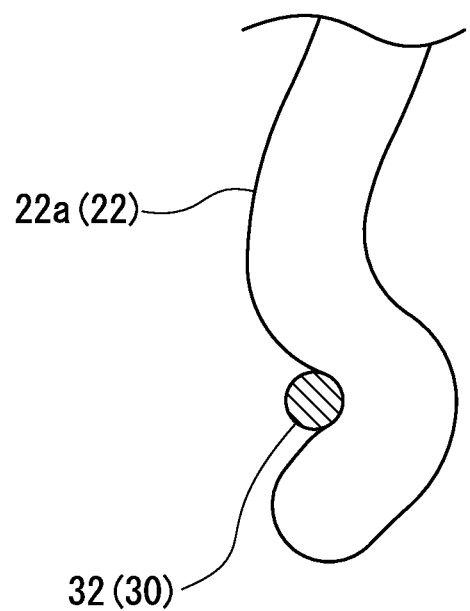
FIG. 6 shows a difference in deformation of the curtain air bag caused by transverse pipes having different diameters.
Figure 6:
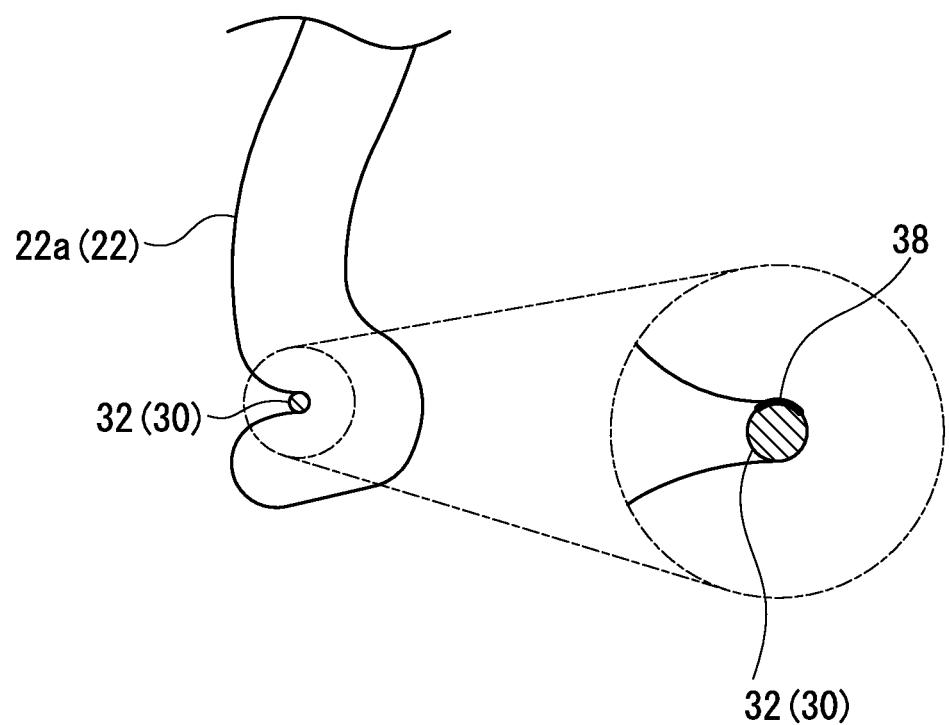

A smaller diameter of the transverse pipe 32 is desirable, provided that a necessary stiffness of the transverse pipe 32 is maintained. This is because as the diameter of the transverse pipe 32 becomes smaller, the transverse pipe 32 becomes less obstructive to visibility. In addition, the transverse pipe 32 having a smaller diameter can be easily wedged in the curtain air bag 22, to thereby hamper the curtain air bag 22 from sliding up on the transverse pipe 32. Specifically, as shown in FIG. 6, an area of contact with the curtain air bag 22 on the transverse pipe 32 having a large diameter (illustrated in an upper diagram in FIG. 6) is greater than that on the transverse pipe 32 having a small diameter (illustrated in a lower diagram in FIG. 6). For this reason, when the transverse pipe 32 having the large diameter is installed, a stress applied to the curtain air bag 22 is less concentrated than in a case where the transverse pipe 32 having the small diameter is installed, which causes the transverse pipe 32 to be wedged in the curtain air bag 22 more shallowly than in the case of the transverse pipe 32 having the small diameter. Then, for the transverse pipe 32 having the large diameter, because it is shallowly wedged in the curtain air bag 22, the curtain air bag 22 is more apt to slide on the surface of the transverse pipe 32 and creep up thereon. On the other hand, when the transverse pipe 32 having the small diameter is installed, the transverse pipe 32 is deeply wedged in the curtain air bag 22, which causes the surface of the curtain air bag 22 to be sharply bent and accordingly hampered from creeping up on the transverse pipe 32. As a result, the escape of the curtain air bag 22 flying out of the vehicle can be effectively prevented. With this in view, the transverse pipe 32 is designed to be as small as possible within a range in which the stiffness of the traverse pipe 32 is maintained. For example, depending on the material, a vertical dimension of the transverse pipe 32 may be ½ the thickness Wb of the inflating region 22a or less, more particularly, ⅕ the thickness Wb or less.

To prevent creeping up behavior of the curtain air bag 22, as shown in an enlarged view on a lower part of FIG. 6, a high friction part 38 having a high friction coefficient may be disposed on the surface of the transverse pipe 32. Because it is necessary to avoid a situation in which the high friction member 38 hampers swift deployment of the curtain air bag 22, the high friction member 38 can be disposed, on the surface of the transverse pipe 32, in a range in which the high friction part 38 is not brought into contact with the curtain air bag 22 during deployment thereof, but is brought into contact with the curtain air bag 22 when the curtain air bag 22 is pushed outward (i.e., the range indicated by a thick line in FIG. 6). For example, the range covers a location around the top of the transverse pipe 32. It should be noted that the high friction part 38 may be formed by adhering or coating a material having a high friction coefficient, such as a rubber, for example, onto the surface of the transverse pipe 32, or by performing surface treatment, such as, for example, a knurling process to form projections and depressions on the surface of the transverse pipe 32.

With or without the high friction part 38, the side structure according to this example can effectively prevent that the curtain air bag 22 flying out or being flung out of the vehicle, while simultaneously avoiding both increasing the cost and limiting the visibility. It should be noted that the above-described configuration is merely presented by way of illustration, and the above-described components or features may be changed as appropriate, other than the bar-shaped member 30 configured to partition the window opening 12 in upper and lower sections is disposed inside the window opening 12 or at a position located, in the vehicle width direction, on the inner side of the window opening 12 and also located on the outer side of the fully inflated curtain air bag 22, and at least a part of the fully inflated curtain air bag 22 is expanded to a position below the bar-shaped member 30.

For example, the transverse pipe 32 being a completely independent member separated from the window glass 14 is used as the bar-shaped member 30 in the above-described example. When configured in this way, the window 11 can be simplified in structure. However, the form of the bar-shaped member 30 may be changed as appropriate, and may be implemented, as shown in FIG. 7, by a division bar 34 which is disposed within the window opening 12 so as to physically divide the window glass 14 into upper and lower sections. In this case, it can be completely prevented that the curtain air bag 22 enters a gap between the bar-shaped member 30 and the window glass 14.

Figure 8:
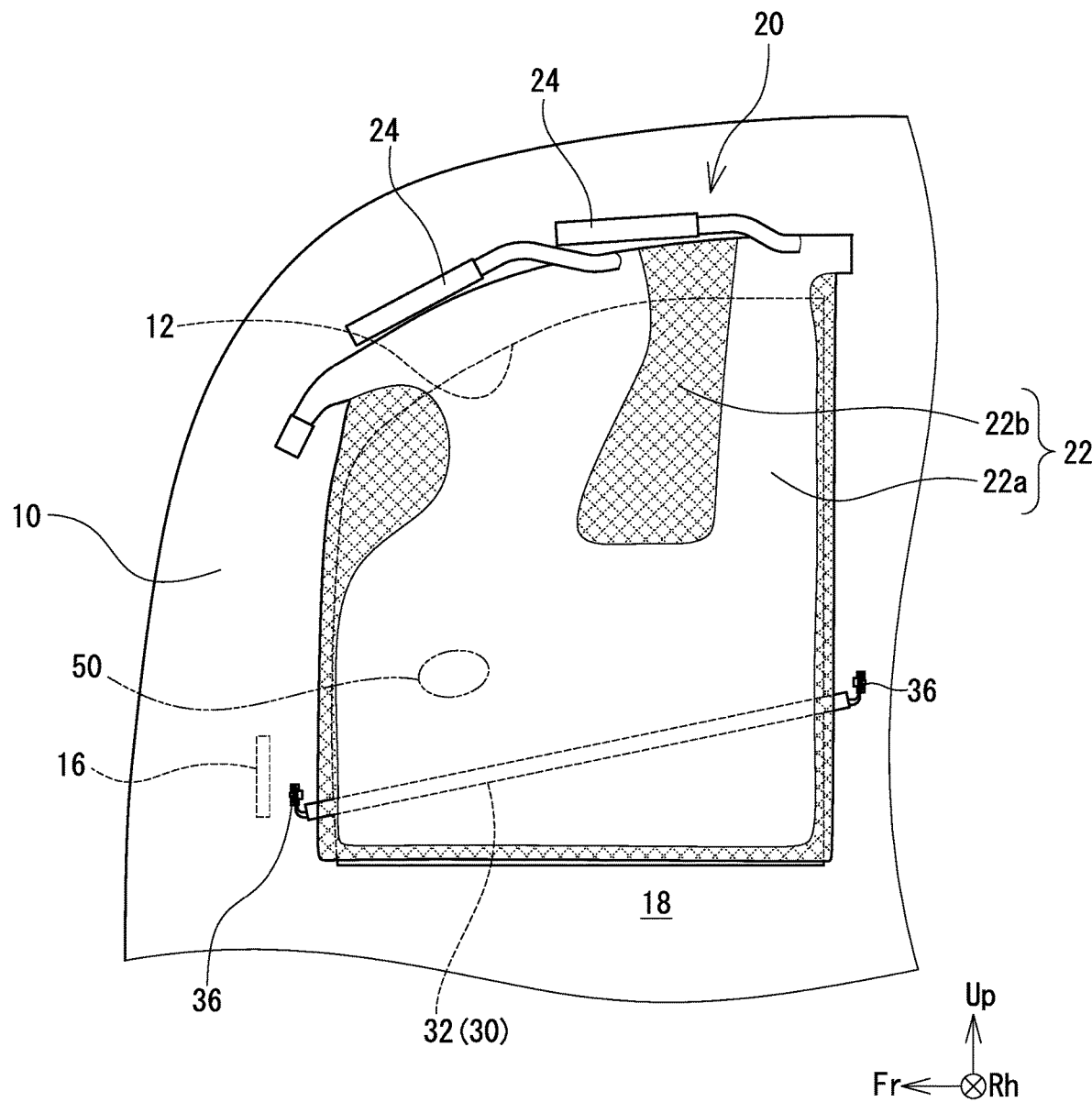
FIG. 8 shows a further example of the vehicle side structure.

In addition, the bar-shaped member 30 may be inclined relative to a longitudinal axis of the vehicle, and may be, for example, upwardly inclined to become higher as it approaches a rear part of the vehicle as shown in FIG. 8. Conversely stating, the bar-shaped member 30 may be downwardly inclined to become lower as it approaches the side mirror 16. When the bar-shaped member 30 is formed as described above, the bar-shaped member 30 is apt to extend on a lower side of a line connecting the pupils of the vehicle occupant 100 and the side mirror 16, which can effectively prevent the bar-shaped member 30 from obstructing the driving visibility. In addition, when the bar-shaped member 30 is upwardly inclined to become higher toward the rear, a rear region of the bar-shaped member 30 is located at a relatively upper position, which can increase an area of a portion of the inflating region 22a that is expanded downward of the bar-shaped member 30. This can further ensure that the curtain air bag 22 is prevented from flying out of the vehicle. Meanwhile, when the bar-shaped member 30 is sufficiently small and does not obstruct the driving visibility, the bar-shaped member 30 may be located on an upper side of the line K1 connecting the lowermost end of the 95th percentile eyellipse 50 and the lower corner of the side mirror 16.

REFERENCE SIGNS LIST side wall, 11 window, 12 window opening, 14 window glass, 16 side mirror, 18 trim panel, 20 curtain air bag device, 22 curtain air bag, 22a inflating region, 22b noninflating region, 24 inflator, 30 bar-shaped member, 32 transverse pipe, 34 division bar, 36 fixation bracket, 38 high friction part, 40 seat, 50 eyellipse, 100 vehicle occupant, 100*a* head.

The invention claimed is:

1. A vehicle side structure, comprising:
   a window which comprises a window opening defined in a side wall of a vehicle, and a window glass configured to cover the window opening;
   a curtain air bag device which is attached to a position above the window and comprises a curtain air bag being inflatable to expand downward; and
   a bar-shaped member which is configured to partition the window opening into upper and lower sections when viewed along a lateral direction of the vehicle, wherein
   the bar-shaped member is disposed inside the window opening or at a position located, in a vehicle width direction, on an inner side of the window opening and on an outer side of the curtain air bag being fully inflated, and
   at least a part of the curtain air bag being fully inflated expands to a region below the bar-shaped member.

2. The vehicle side structure according to claim 1, wherein the bar-shaped member is positioned so as to be adjacent to the window glass via a gap smaller than a thickness of the curtain air bag being fully inflated.

3. The vehicle side structure according to claim 1, wherein the bar-shaped member is a division bar disposed inside the window opening so as to divide the window glass.

4. The vehicle side structure according to claim 1, further comprising:
   a seat disposed at a position adjacent to the side wall of the vehicle, the seat configured for a vehicle occupant to sit upon, wherein
   the bar-shaped member is configured to be positioned at a height lower than a head of the vehicle occupant configured to sit on the seat.

5. The vehicle side structure according to claim 1, wherein a vertical position of a lower border of the window opening substantially matches a vertical position of a lower end of the curtain air bag being fully inflated, or lies below the vertical position of the lower end of the curtain air bag.

6. The vehicle side structure according to claim 1, further comprising:
   a side mirror disposed outside the window in the vehicle width direction, wherein
   the bar-shaped member extends below a ling connecting a lowermost end of a 95$^{th}$ percentile eyellipse and a lower end of the side mirror.

7. The vehicle side structure according to claim 1, wherein the bar-shaped member is a pipe extending along a longitudinal direction of the vehicle to partition the window opening into the upper and lower sections when viewed along the lateral direction of the vehicle.

8. The vehicle side structure according to claim 7, wherein both ends of the pipe are fixed onto the side wall of the vehicle by fixation brackets.

9. The vehicle side structure according to claim 1, wherein the curtain air bag being fully inflated has an inflating region which is inflated by gas, and
   wherein a vertical distance from a vertical center of the bar-shaped member to a lower end of the inflating region is greater than 50% of a thickness of the inflating region in the vehicle width direction.

10. The vehicle side structure according to claim 1, wherein the curtain air bag being fully inflated has an inflating region which is inflated by gas, and
    wherein a vertical distance from a vertical center of the bar-shaped member to a lower end of the inflating region is greater than 80% of a thickness of the inflating region in the vehicle width direction.

11. The vehicle side structure according to claim 1, wherein the curtain air bag being fully inflated has an inflating region which is inflated by gas, and
    wherein a length of the inflating region, along a longitudinal direction of the vehicle, at an installation height of the bar-shaped member, is set to a value substantially equal to a length of the window opening along the longitudinal direction of the vehicle.

12. The vehicle side structure according to claim 1, wherein the curtain air bag being fully inflated has an inflating region which is inflated by gas, and
    wherein a vertical dimension of the bar-shaped member is equal to or less than 50% of a thickness of the inflating region in the vehicle width direction.

13. The vehicle side structure according to claim 12, wherein the vertical dimension of the bar-shaped member is equal to or less than 20% of the thickness of the inflating region in the vehicle width direction.

14. The vehicle side structure according to claim 1, wherein a friction part having a friction coefficient is disposed on a surface of the bar-shaped member, the friction coefficient of the friction part is greater than a friction coefficient of the surface of the bar-shaped member.

15. The vehicle side structure according to claim 14, wherein the friction part is disposed on the surface of the bar-shaped member in a range in which the friction part is not brought into contact with the curtain air bag during deployment, but the friction part is brought into contact with the curtain air bag when the curtain air bag is pushed outward in the vehicle width direction.

16. The vehicle side structure according to claim 14, wherein the friction part is formed by adhering or coating a material having a friction coefficient that is greater than the friction coefficient of the surface of the bar-shaped member.

17. The vehicle side structure according to claim 14, wherein the friction part is formed by a surface treatment on the surface of the bar-shaped member to form depressions and projections on the surface of the bar-shaped member.

18. The vehicle side structure according to claim 1, wherein the bar-shaped member is inclined relative to a longitudinal axis of the vehicle.

19. The vehicle side structure according to claim 18, wherein the bar-shaped member is upwardly inclined so as to become higher as the bar-shaped member approaches a rear part of the vehicle.

20. The vehicle side structure according to claim 18, wherein the bar-shaped member is downwardly inclined to become lower as the bar-shaped member approaches a side mirror disposed outside the window in the vehicle width direction.

\* \* \* \* \*